US007239314B2

(12) United States Patent
Johnston

(10) Patent No.: US 7,239,314 B2
(45) Date of Patent: Jul. 3, 2007

(54) METHOD FOR 2-D ANIMATION

(75) Inventor: Scott F. Johnston, Los Angeles, CA (US)

(73) Assignee: Warner Bros. Animation, Sherman Oaks, CA (US)

( * ) Notice: Subject to any disclaimer, the term of this patent is extended or adjusted under 35 U.S.C. 154(b) by 248 days.

(21) Appl. No.: 10/651,909

(22) Filed: Aug. 29, 2003

(65) Prior Publication Data

US 2005/0243089 A1    Nov. 3, 2005

Related U.S. Application Data

(60) Provisional application No. 60/407,021, filed on Aug. 29, 2002.

(51) Int. Cl.
*G06T 15/50* (2006.01)
(52) U.S. Cl. .................................... 345/426
(58) Field of Classification Search ............... None
See application file for complete search history.

(56) References Cited

U.S. PATENT DOCUMENTS

| | | | | |
|---|---|---|---|---|
| 5,315,537 A | * | 5/1994 | Blacker | 716/20 |
| 5,594,841 A | * | 1/1997 | Schutz | 345/419 |
| 5,828,380 A | * | 10/1998 | Lin | 345/441 |
| 5,912,994 A | * | 6/1999 | Norton et al. | 382/283 |
| 6,034,739 A | * | 3/2000 | Rohlfing et al. | 348/586 |
| 6,094,508 A | * | 7/2000 | Acharya et al. | 382/199 |
| 6,163,319 A | * | 12/2000 | Peercy et al. | 345/426 |
| 6,301,496 B1 | * | 10/2001 | Reisfeld | 600/407 |
| 6,323,863 B1 | * | 11/2001 | Shinagawa et al. | 345/441 |
| 6,618,046 B1 | * | 9/2003 | Srinivasa et al. | 345/418 |
| 6,909,438 B1 | * | 6/2005 | White et al. | 345/629 |
| 2003/0063096 A1 | * | 4/2003 | Burke | 345/582 |
| 2003/0112237 A1 | * | 6/2003 | Corbetta | 345/426 |
| 2004/0012607 A1 | * | 1/2004 | Witt | 345/592 |

OTHER PUBLICATIONS

Article "Real-Time Realistic Lighting Effects" by Kenneth E. Hoff, Summer 1998 Internship Project, at Walt Disney Imagineering Research & Development VR-Studio, in the Lighting Effects Library modules, spheremap: reflections, non-photorealistic "outlining" effects, pp. 1-4, http://www.cs.unc.edu/~hoff/projects/summer98_disney_lighting_effects.*

(Continued)

*Primary Examiner*—Mark Zimmerman
*Assistant Examiner*—Enrique L. Santiago
(74) *Attorney, Agent, or Firm*—Connolly Bove Lodge & Hutz LLP; Jonathan Jaech

(57) ABSTRACT

A method for approximating the lighting of a 2-dimensional image that is to be incorporated into a live-action scene using an image processing tool. The 2-dimensional image has an interior defined by an edge. The method includes: approximating a plurality of edge normal vectors along the edge of the image, approximating a plurality of interior normal vectors across the interior of the image, and rendering the image based on the plurality of edge normal vectors and the plurality of interior normal vectors.

9 Claims, 5 Drawing Sheets
(5 of 5 Drawing Sheet(s) Filed in Color)

OTHER PUBLICATIONS

"Computer Graphics, Principles and practice" Second Edition, pp. 606,607,737-739 and 758. James D. Foley et al. Addison-Wesley Publishing Company, ISBN 0-201-12110-7.*

Apodaca, A. A., and Gritz, L. 2000. Chapter 16. Nonphotorealistic Rendering with RenderMan, by Scott Johnston, Advanced Render-Man: Creating CGI for Motion Pictures. Morgan Kaufman, San Francisco.

Correa, W. T., Jensen, R. J., Thayer, C. E., and Finkelstein, A. 1998. Texture Mapping for Cel Animation. Computer Graphics 32, Annual Conference Series (Aug.), 435-446.

Gortler, S. J., Grzeszczuk, R., Szeliski, R., and Cohen, M. F. 1996. The Lumigraph. Proceedings of ACM SIGGRAPH 1996 30, Annual Conference Series, 43-54.

Haeberli, P. 1990. Paint By Numbers: Abstract Image Representations. Computer Graphics 24, 4 (Aug.), 207-214.

Igarashi, T., Matsuoka, S., and Tanaka, H. 1999. Teddy: A Sketching Interface for 3D Freeform Design. Computer Graphics 33, Annual Conference Series, 409-416.

Markosian, L., Kowalski, M. A., Trychin, S. J., Bourdev, L. D., Goldstein, D., and Hughes, J. F. 1997. Real-Time Nonphotorealistic Rendering. Computer Graphics 31, Annual Conference Series (Aug.), 415-420.

Meier, B. J. 1996. Painterly Rendering for Animation. Computer Graphics 30, Annual Conference Series, 477-484.

Perlin, K. 1985. An Image Synthesizer. Computer Graphics 19, 3 (Jul.), 287-296.

Petrovic, L., Fujito, B., Williams, L., and Finkelstein, A. 2000. Shadows for Cel Animation. In Proceedings of SIGGRAPH 2000, ACM Press / ACM SIGGRAPH, Computer Graphics Proceedings, Annual Conference Series, ACM, 511-516.

Press, W. H., Teukolsky, S. A., Vetterling, W. T., and Flannery, B. P. 1992. Numerical Recipes in C: The Art of Scientific Computing, Second Edition. Cambridge University Press, Cambridge, United Kingdom, 863-882.

Ramamoorthi, R., and Hanrahan, P. 2001. An Efficient Representation for Irradiance Environment Maps. In Proceedings of SIGGRAPH 2001, ACM Press / ACM SIGGRAPH, Computer Graphics Proceedings, Annual Conference Series, ACM, 497-500.

Saito, T., and Takahashi, T. 1990. Comprehensible Rendering of 3-D Shapes. Computer Graphics 24, 4 (Aug.), 197-206.

Zelenik, R. C., Herndon, K. P., and Hughes, J. F. 1996. SKETCH: An Interface for Sketching 3D Scenes. Computer Graphics 30, Annual Conference Series, 163-170.

* cited by examiner

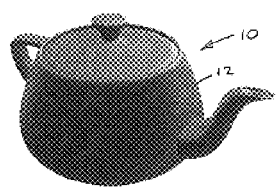
FIG. 1
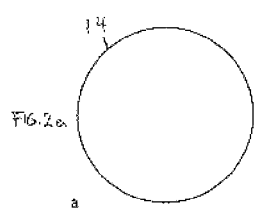 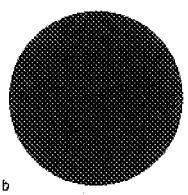 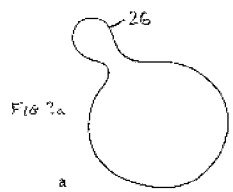 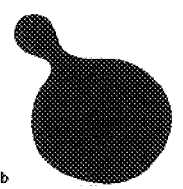
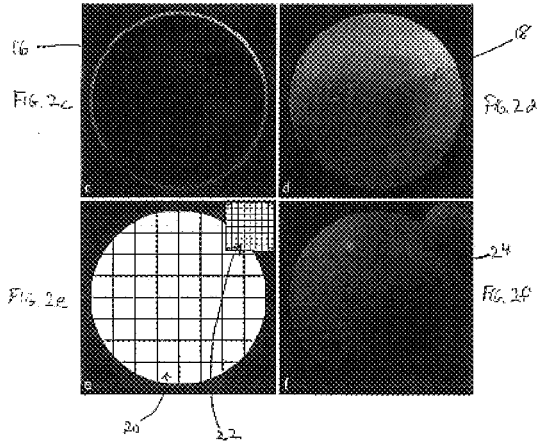 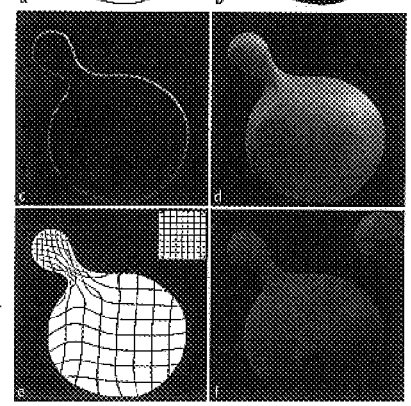

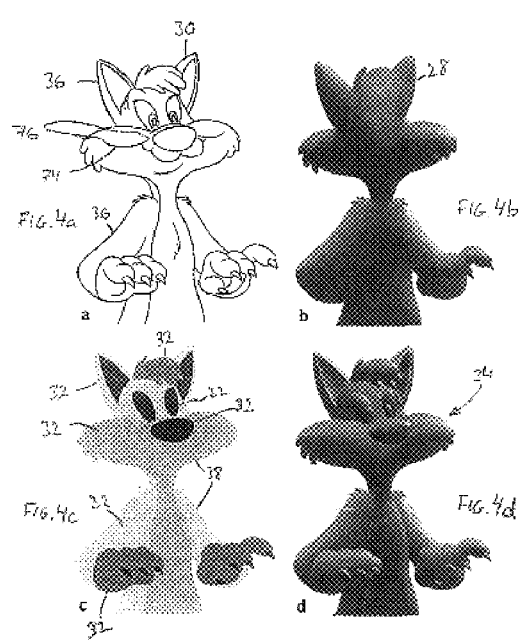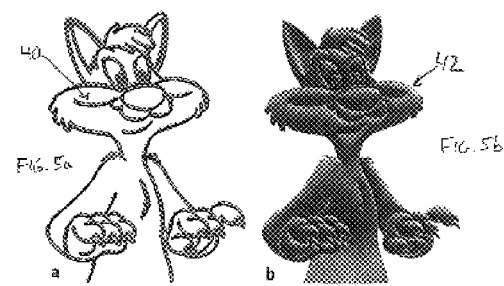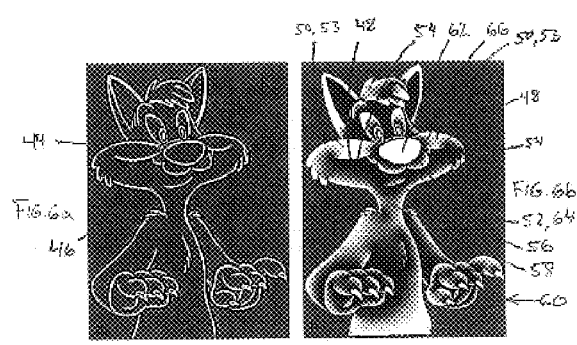

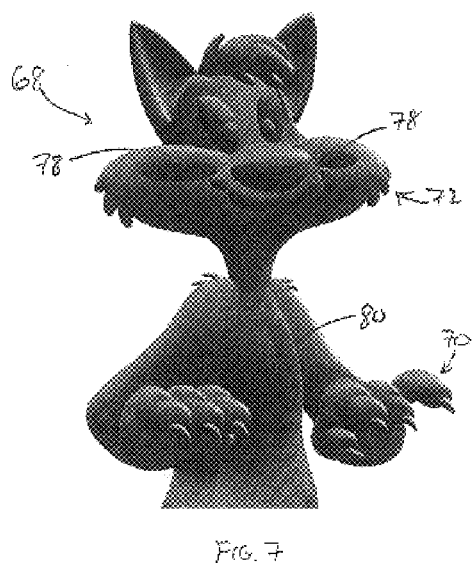
FIG. 7
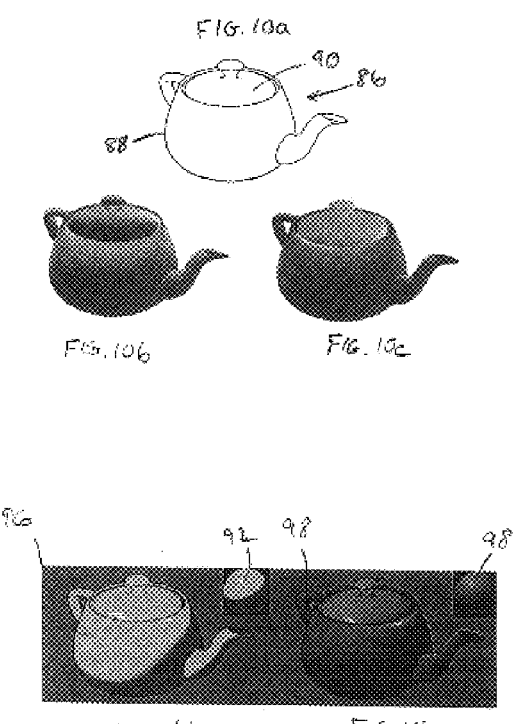
FIG. 10a
FIG. 10b    FIG. 10c
FIG. 11a    FIG. 11b

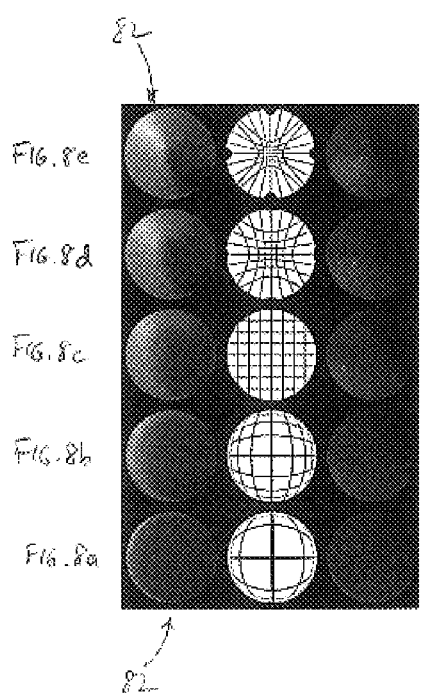
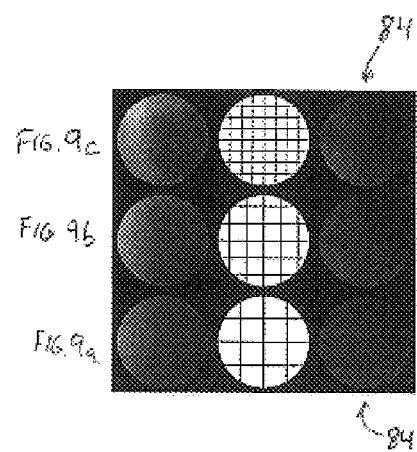

METHOD FOR 2-D ANIMATION

CROSS-REFERENCE TO RELATED APPLICATION

Priority is claimed to U.S. Provisional Patent Application No. 60/407,021, filed on Aug. 29, 2002, entitled "Method And Apparatus For 2-D Animation" by Scott F. Johnston, which application is incorporated by reference herein.

A portion of the disclosure of this patent document contains material which is subject to copyright protection. The copyright owner has no objection to the facsimile reproduction by any one of the patent disclosure, as it appears in the Patent and Trademark Office patent files or records, but otherwise reserves all copyrights whatsover.

BACKGROUND OF THE INVENTION

This invention related generally to the field of animation, and more particularly to a method for approximating the lighting of a 2-dimensional animated image.

For more than 80 years, artists and film makers have attempted to blend 2-dimensional ("2-D") animation and 3-dimensional ("3-D") live action scenes seamlessly in movies. High points in the integration of the two media include the Fleischer Studio's "Out of the Inkwell" series in the 1920's, MGM's "Anchors Aweigh" (1945), Disney's "Mary Poppins" (1964), and the Disney-Amblin co-production "Who Framed Roger Rabbit" (1988), as discussed in C. Solomon, *Enchanted Drawings: The History of Animation*, Knopf, New York (1989). In each case, the artists utilized, and often invented, the most sophisticated technologies available at the time, for example, the rotoscope, the sodium/blue-screen, traveling mattes, and optical printing. Currently, artists use 3-D computer graphics ("CG") tools to design and create new animated characters, however, the use of 3-D CG tools to recreate drawn characters faithfully has proved expensive and often ineffectual.

The primary components used to illuminate a point on a surface of an object in 3-D are its position and surface normal. In hand-drawn artwork, the surface normal is unknown, and the position information lacks depth. Previous work completes the data through geometric methods—creating a 3-D surface from 2-D information, as discussed in T. Igarashi et al., Teddy: A Sketching Interface For 3D Freeform Design, *Computer Graphics* 33, Annual Conference Series, 409–416 (1999); or fitting a 3-D geometric model to the 2-D data as discussed in W. T. Correa et al., Texture Mapping For Cel Animation, *Computer Graphics* 32, Annual Conference Series (Aug.), 435–446 (1998).

Systems like Teddy (see previously mentioned Igarashi et al.) and SKETCH, discussed in R. C. Zeleznik et al., SKETCH: An Interface For Sketching 3D Scenes, *Computer Graphics* 30, Annual Conference Series, 163–170 (1996), provide interactive tools for building 3-D models from 2-D data, automating the "inflation" of a 2-D image to 3-D geometry. In L. Petrovic et al., Shadows For Cel Animation, *Proceedings of SIGGRAPH* 2000, ACM Press/ACM SIGGRAPH, Computer Graphics Proceedings, Annual Conference Series, ACM, 511–516 (2000), these ideas are expanded and applied to existing drawings to create shadows for cel animation through derived geometry. Also, in W. T. Correa et al. (see above), existing geometry was taken and deformed to match cel animation for texturing and illumination purposes. More recently, sparse interpolation has been used for image reconstruction in lumigraphs, as discussed in S. J. Gortler et al., The Lumigraph, *Proceedings of ACM SIGGRAPH* 1996 30, Annual Conference Series, 43–54 (1996).

The above geometric methods provide useful results and can work well for integrated 2-D/3-D pipelines. However, these geometric methods work best when the images are less fluid, and, thus are less efficient for "cartoony" animated images, where the addition, removal, or modification of a few lines can alter the geometry of the image. Accordingly, there is a need for a method for efficiently illuminating a 2-D animated image without having to establish the depth of the image. The present invention satisfies this need.

SUMMARY OF THE INVENTION

The present invention resides in a method for efficiently illuminating a 2-dimensional animated image without having to establish the depth of the image. The method approximates the lighting of a 2-dimensional image that is to be incorporated into a live-action scene using an image processing tool. The 2-dimensional image has an interior defined by an edge. The method includes: approximating a plurality of edge normal vectors along the edge of the image, approximating a plurality of interior normal vectors across the interior of the image, and rendering the image based on the plurality of edge normal vectors and the plurality of interior normal vectors.

In other, more detailed features of the invention, the step of approximating the plurality of edge normal vectors includes calculating a gradient across the image and normalizing the gradient. Also, each of the plurality of edge normal vectors and each of the plurality of interior normal vectors include directional components, wherein one or more of the directional components is scaled to adjust the rendered image. In addition, the plurality of edge normal vectors and the plurality of interior normal vectors can be color adjusted.

In other, more detailed features of the invention, the step of rendering the image is performed using a technique selected from a group consisting of a 3-dimensional rendering technique, and a compositing operation technique. Also, the step of rendering the image is performed using a technique selected from a group consisting of a photorealistic rendering technique and a non-photorealistic rendering technique. In addition, the step of rendering the image includes spheremapping.

In other, more detailed features of the invention, the step of approximating the plurality of interior normal vectors comprises interpolating the plurality of edge normal vectors across the image.

In other, more detailed features of the invention, each of the plurality of edge normal vectors and each of the plurality of interior normal vectors have directional components including an x-component and a y-component within the plane of the image, and a z-component perpendicular to the plane of the image. The x-components and the y-components of the plurality of edge normal vectors and the plurality of interior normal vectors are interpolated across the image. The z-component of each of the plurality of interior normal vectors is recomputed to maintain the unit length of the interior normal vector.

In other, more detailed features of the invention, the interior of the image includes a line having opposed edges, and the method further comprises generating opposed normal vectors along each of the opposed edges of the line by calculating a gradient across the line. Also, a light color is added along one of the opposed edges of the line and a dark color is added along the other of the opposed edges of the line. In addition, a grayscale matte of the image is formed by interpolating the image after the addition of the light color and the dark color to the image.

In other, more detailed features of the invention, the image is lit by a light source having a light vector resulting in the image having a lit portion, an unlit portion, and a boundary between the lit portion and the unlit portion. The method further comprises: providing a tone matte having an edge that defines the boundary between the lit portion and the unlit portion of the image, adjusting the plurality of edge normal vectors and the plurality of interior normal vectors near the edge of the tone matte by projecting the plurality of edge normal vectors and the plurality of interior normal vectors onto a plane perpendicular to the light vector, and renormalizing the plurality of edge normal vectors and the plurality of interior normal vectors.

Another exemplary method according to the invention, is a method for approximating the lighting of a 2-dimensional image that is to be incorporated into a live-action scene using an image processing tool. The 2-dimensional image an interior defined by an edge, and the interior of the image includes a line having opposed edges. The method includes: approximating a plurality of edge normal vectors along the edge of the image, approximating a plurality of interior normal vectors across the interior of the image, generating opposed normal vectors on each of the opposed edges of the line by calculating a gradient across the line, adding a light color along one of the opposed edges of the line and adding a dark color along the other of the opposed edges of the line, forming a grayscale matte of the image by interpolating the image after the addition of the light color and the dark color to the image, and rendering the image based on the plurality of edge normal vectors and a combination of the opposing normals and the plurality of interior normal vectors using the gray matte as a key.

Another exemplary method according to the invention, is a method for approximating the lighting of a 2-dimensional image that is to be incorporated into a live-action scene using an image processing tool. The method includes: calculating a first approximation of a plurality of normal vectors for the image, preparing a first confidence matte for the first approximation, preparing a first weighted approximation by weighting the first approximation by the first confidence matte, calculating a second approximation of a plurality of normal vectors for the image, preparing a second confidence matte for the second approximation, preparing a second weighted approximation by weighting the second approximation by the second confidence matte, and combining the first weighted approximation and the second weighted approximation.

In another exemplary method, which embodies the invention, the method can be summarized as:
given an initial image comprises of lines,
tag lines with light and dark values,
approximate normals based on lines and tagging (via gradients and interpolation), and
using approximated normals.

In other, more detailed features of the invention, the method can be further broken down as:
a subset of an image's lines form the exterior silhouette of the object to be illuminated,
normals are generated along the exterior silhouette,
these normals are interpolated across the image to form a field of normals (this is a first approximation),
another set of (opposing) normals is generated along all the lines,
these normals are interpolated across the image to form a field of normals (this is a second approximation),
light and dark values are assigned to the opposing sides of each line establishing localized layering information,
these values are interpolated across the image to form a grayscale matte,
the first and second normal approximations are blended with the grayscale matte as a key to produce a refined normal approximation.

Other features and advantages of the present invention should become apparent from the following description of the preferred embodiments taken in conjunction with the accompanying drawings, which illustrate, by way of example, the principles of the invention.

BRIEF DESCRIPTION OF THE DRAWINGS

The patent or application file contains at least one drawing executed in color. Copies of this patent or patent application publication with color drawings will be provided by the Office upon request and payment of the necessary fee.

FIG. 1 is a perspective drawing of a rendered RGB representation of surface normals for a teapot.

FIGS. 2a–2f are plan drawings illustrating the process of illustrating a circle using a method according to the present invention.

FIGS. 3a–3f are plan drawings illustrating the process of illustrating a 2-D shape using a method according to the present invention.

FIGS. 4a–4d are perspective drawings of an animated cat illustrating the use of approximated surface normals and mattes.

FIGS. 5a–b are perspective drawings of the animated cat of FIG. 4a illustrating opposing normals and interpolation resulting in "quilted" normals.

FIGS. 6a–b are perspective drawings of the animated cat of FIG. 4a.

FIG. 7 is a perspective drawing of the animated cat of FIG. 4a illustrating the blending of quilted line-based normals with simple region-based normals using a confidence matte as a key.

FIGS. 8a–e are plan drawings illustrating z-scaled normals for a circle.

FIGS. 9a–c are plan drawings illustrating uniformly scaled normals for a circle.

FIGS. 10a–c are perspective drawings illustrating a teapot, overly rounded derived normals for the teapot, and color adjusted normals for the teapot.

FIGS. 11a–b are perspective drawings illustrating spheremap illumination on teapots.

DESCRIPTION OF THE PREFERRED EMBODIMENTS

Figures 12A, 12B, 12C, 12D:
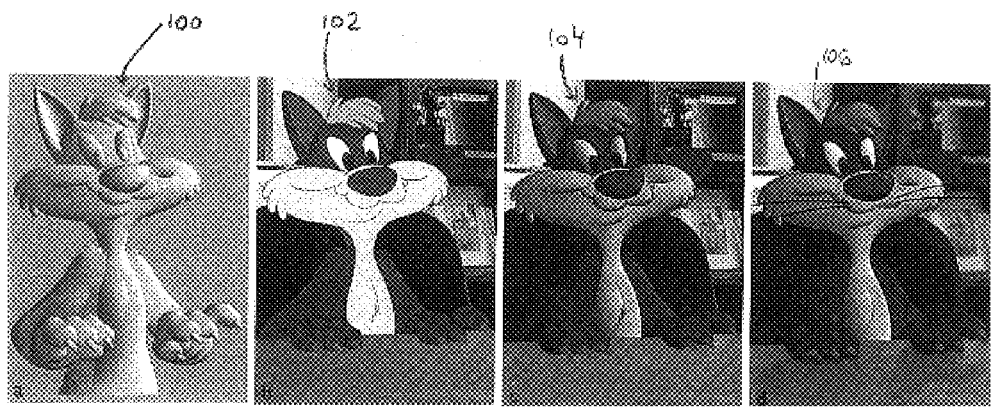
FIGS. 12a–d are perspective drawings of the animated cat of FIG. 4a illustrating a normal image of the animated cat illuminated by diffuse spheremapping, a base palette of the animated cat, the animated cat scaled by illumination, and the final animated cat in a 3-D scene.

The present invention resides in a method to approximate the lighting on 2-D images, and, thus provides a solution to the problem of incorporating 2-D cel animation into live-action scenes. The present invention augments the existing methods of drawing "rims and tones" with subtle environmental illumination. The present invention has both photorealistic and non-photorealistic applications.

The present invention advantageously utilizes image-based techniques to approximate the surface normal of an object directly, avoiding the transition from the 2-D image to 3-D geometry. The present invention also provides a generalized solution for lighting curved surfaces that change over time. Since there is no need to see around the objects, accurate depth information is not the primary goal, rather, convincing illumination is generated from 2-D positions and approximate surface normals. The present invention estimates surface normals wherever possible, and uses sparse interpolation to approximate the surface normal over the remaining image. Edge information is used to identify localized layering within an image. To improve the overall result, multiple approximations of the surface normals are blended together weighted by "confidence mattes" generated from the layering information. Rendering is performed with either 3-D tools, or via compositing operations to light the normal image and apply it to the original artwork.

One problem that has dogged attempts to integrate 2-D animation with 3-D live action scenes is the inescapably flat look of the animation artwork. In traditional ink and paint images, the animator's drawings are traced onto the front surface of clear acetate cels in ink. Each cel is then flipped over and paint is applied to its back surface, producing flat areas of color with ink lines hiding the boundaries between paint regions. The process is an early example of an indexed color system where appropriate paint colors are chosen based on the region to be filled. Film makers have attempted to soften the flatness of traditional ink and paint images since the mid-1930's, when artists applied real rouge to Snow White's cheeks.

Rims and tones are effects mattes drawn to add highlights to the objects in the artwork, and to distinguish between the lit and shadowed sides of an object. Rims and tones add detail to the original drawing, help to place the object into a particular lighting situation, and can intensify the mood of the drawing. By heightening the perceived volume of an object, tones enhance the object's believability in its environment. Generating tones by hand is time consuming, however, it is commonly used to place 2-D animation into a live-action scenes. Tone mattes are applied over the animated character in a camera setup to overexpose, underexpose, or filter portions of the 2-D image.

Most digital ink and paint systems adopt the traditional strategy of keeping the ink and paint on separate layers and using indexed color. An indexed system has several advantages including: it allows final color selection to be delayed in the production pipeline until other color decisions are finalized, and the same source material can be used multiple times with different look-up table (commonly called palettes).

The ink and paint process is performed using a painter's palette. Contrasting false-colors helps the painter discern regions that may show only slight variations on-screen. Base palettes of standard or neutral colors for a character are the starting point for a sequence or location. The base palette is modified on a scene-by-scene basis to place the character in the environment, creating a styled palette.

Digital compositing offers more options than traditional ink and paint processes for applying tone mattes. A character is often color-styled twice, with separate palettes for shadow and light. The shadow and light versions are blended with a tone matte used as a key. This gives the art director region-by-region control over the effect of the tone. Blurring a tone matte softens the boundary between the two sides. Multiple palettes and mattes can be combined to heighten the effect.

A compact method for storing 2-D cel animation is to encode each drawing in a multi-channel image, as discussed in A. A. Apodaca et al., *Advanced RenderMan: Creating CGI For Motion Pictures*, Morgan Kaufman, San Francisco (2000). During encoding, scanned grayscale drawings are stored in one channel. For any non-zero pixel in the scan—wherever there is line data—an index value for an ink color is placed in another channel. Regions in a third channel are filled with index values for paint colors. The indexed channels are aliased, but the boundaries between regions are hidden beneath opaque, anti-aliased ink lines, as on a traditional cel. To preserve valid index values, care must be taken when filtering these channels.

Look-up tables are used to turn an ink and paint map into a proper color image. The ink index channel is resolved with an ink palette, multiplied by the grayscale ink value to form an ink layer, composed over the paint index channel, and resolved by a paint palette. Different look-up tables can be applied to the same source image for different results, or to pull mattes from specific areas (e.g., a look-up table where all inks and paints are transparent except for the eyes can be used to pull an eye matte).

Normal Image

A normal image is an red, green, and blue ("RGB") color space representation of normal vector $(N_x, N_y, N_z)$ information for the surface of a 3-D image. Signed normal vector values are stored in a float image type, or the normal vector range [−1.0, 1.0] is mapped to [0, ONE], centered at ONE/2 for unsigned integer storage. The normals can be in any space, but it is convenient to transform them to screen space (X, Y) with depth Z. FIG. 1 shows a normal image rendering of the classic teapot 12.

Normal Approximation

One of the principle methods for detecting visible edges in ink and paint renderings is to find points where the surface normal is perpendicular to the eye vector. For curved surfaces, these form the exterior silhouette and interior folds. By inverting this process, normal vectors are generated along these edges using the following methods. These normals are a geometric quantity that are stored as an image for convenience. There are image-processing methods that have geometric meaning when applied to the encoded image.

Region-Based Normals: Blobbing

An example of the normal approximation process is shown in FIGS. 2a–f where a drawn circle 14 (FIG. 2a) is presumed to be the 2-D representation of a sphere (not shown). Calculating the gradient across the circle's matte (FIG. 2b) and normalizing the result produces FIG. 2c. For an orthographic projection, the z-component of the normal vectors along the edge of a curved surface must be zero to keep the normal perpendicular to the eye vector, making normalized gradients an adequate approximation of the edge normal vectors 16 (scaling, introduced later, allows the results to appear more like a perspective projection). Interpolating the edge normal vectors across the image generates a field of normal vectors 18 across the interior of the image ("the interior normal vectors") (FIG. 2d). The $(N_x, N_y)$ components of the normal image linearly interpolate the field, as illustrated by using $(N_x, N_y)$ as the parametric coordinates for texture mapping a grid image 20 (FIG. 2e, the texture source 22 is inset). The $(N_x, N_y)$ space can just as easily map a rendered sphere 24 onto the circle (FIG. 2f).

Applying the same process shown in FIGS. 2a–f to another curve 26 shown in FIG. 3a, shows that the same sphere mapped onto a more arbitrary interpolated normal field provides a good illusion of shape and illumination (see FIGS. 3a–3f).

Referring to FIGS. 4a–d, the basic blobby shape 28 created from the exterior boundaries of a more complex image 30 (see FIG. 4a) has very little detail (see FIG. 4b). Using mattes to separate regions 32 (FIG. 4c), applying the above normal approximation process on each region, and compositing the results creates a more accurate representation 34 of the normals that make up the image (FIG. 4d). However, the result still lacks much of the detail contained in the original image.

Line-Based Normals: Quilting

When the gradient is computed across ink lines 36 (see FIG. 4a), rather than matte edges 38 (see FIG. 4c), opposing normals 40 are generated on each side of the lines as shown in FIG. 5a. When these normals are interpolated, much more detail is revealed, however, the image appears quilted. The internal folds 42 should only affect the normals on one side of the edge, not both, as shown in FIG. 5b.

Over/Under Assignment

The present invention advantageously provides for the identification and integration of implied layering within a drawing to assist in generating approximate surface normals. A drawn line 36 can be interpreted as a boundary separating two regions 32. In many circumstances, one of these regions overlaps the other. Tagging edges with white on the "over" side 44 and black on the "under" side 46 produces an illustration that better defines the layering within the image. For example, referring to FIG. 6a, the lines 48 for the cat's cheeks 50 represent the boundary of an internal fold where the cheeks occlude part of his upper lip 52. The upper side 53 of the cat's cheek lines 48 are tagged white and the lower side 54 black to indicate that his cheeks are over his lip. Similarly, his chin 56 is over his neck 58, the fingers 60 are layered over one another.

In traditional ink and paint images, light ink lines are used within regions of dark paint to reveal detail. These internal lines are called "light over dark" or "L.O.D." lines. In the present invention, L.O.D. serves as a mnemonic for the painters when assigning layering information to the edges. The ink and paint artists perform "over" and "under" tagging as an additional step in the digital animation process. The tools to tag the edges make an initial best-guess for each line segment by inspecting a relative-depth list of paint regions. The cat's nose 62 is on top of his muzzle 64, so the "nose" side of a line 66 bordering those regions is set to white and the "muzzle" side black. For line segments that don't border paint regions, the dominant curvature establishes the initial condition, for example, the inside of a "C" curve is tagged "over" and the outside "under." Interactive tools allow painters to edit the edge assignments for a sequence of images.

Confidence Mattes

Referring to FIG. 6b, when the over/under edge illustration is interpolated, it forms a grayscale matte. The quilted normal image is a more accurate representation of the normals on the "over" side of the edges where the matte is white, while the normals on the darker "under" side of an edge are less certain. These mattes can be viewed as a measure of confidence in the known normals. The normal on the under side of an edge should interpolate the shape of the underlying object as if that edge didn't exist. In practice, this can be difficult to determine, as it may involve lines that are not part of the image. However, the previously discussed blobby normal image is a gross approximation of removing all the internal lines.

Normal Blending

By blending the quilted and blobby normals using the over/under confidence matte as a key, a normal image 68 is formed that resembles a bas-relief of the object, as shown in FIG. 7. Quick blending can be performed on the $N_x$ and $N_y$ components of the normal images using linear interpolation, with $N_z$ recomputed from the result to maintain unit-length of the normal vector. This method is adequate when the source normals vary only slightly, however, it is more accurate to use great-arc interpolation.

Blending multiple normal approximations, each weighted with its own confidence matte, can incrementally build more accuracy into the resulting image. It is also possible, though not always practical, to clean up the rough animation drawings throughout the multiple levels of the process to aid in the generation of more accurate normals. For example, when the cat's paw 70 passes in front of his face 72, information is lost for computing normals on his face. This isn't a problem where the face is obscured by the paw, but errors appear on the face at the boundary between it and the paw. The error would be reduced if the face and the paw were drawn on separate levels.

Image-Based Manipulation

Normal images and confidence mattes can be manipulated using image-based tools to further improve results. Paint palette mattes are useful for localized control of these adjustments. Tracking an approximate 3-D orientation for an object allows normal vector manipulations to be performed in either screen space or object space.

Tapered Edges in Confidence Matte

Referring to FIG. 4a, open-ended lines 74 create dimples in the interpolated matte at the open endpoints 76. Fading the ends on the "over" side of an open-ended line to black creates a softer, more natural transition. This tapers the effect of the "over" normal towards the tip of the line, as seen in the cat's cheeks 78 in FIG. 7.

Similarly, the effect of a normal can be reduced uniformly on a set of lines by scaling the edge confidence with an ink palette prior to sparse interpolation. For example, referring to FIG. 7, the cat's chest line 80 has been reduced slightly to make him less busty.

Z-Scaling Normal

Two methods of scaling are used to adjust a region's puffiness. The first method replaces a normal with the normal of a sphere that has been scaled in the z direction, and the second method replaces a normal with the normal of a portion of a sphere that has been scaled uniformly.

To map a field of normals to a sphere scaled in the z direction by a scale factor, S, a pixel operation is applied replacing ($N_x$, $N_y$, $N_z$) with:

$$\frac{(S \cdot N_x, S \cdot N_y, N_z)}{\|(S \cdot N_x, S \cdot N_y, N_z)\|}$$

When the scale factor is less than one, the region becomes shallower, and when it is greater than one, the region appears deeper, as shown in FIGS. 8a–e, which illustrate z-scaled sphere normals 82 with S=0.25 (FIG. 8a), S=0.5 (FIG. 8b), S=1.0 (FIG. 8c), S=2.0 (FIG. 8d), and S=4.0 (FIG. 8e).

Transforming the normals into a different space, applying the z-scale, and then transforming them back to screen space can achieve similar results in a direction other than z.

Rather than maintaining $N_z=0$ along the edges for a steep drop-off, it may be preferable to make the edge normals more subtle. In fact, objects viewed in perspective have slightly non-zero z-components on their silhouette. For example, the visible portion of a sphere is a slice from the front of the sphere. To remap hemispherical normals to the normals of a visible unit-sphere slice of thickness S, $N_x$ and $N_y$ are linearly scaled by $(S\cdot(2-S))^{(1/2)}$ and $N_z$ is recomputed to maintain unit length as shown in FIGS. 9a–c, which illustrate uniformly scaled spheres 84 where S=0.125 (FIG. 9a), S=0.25 (FIG. 9b), and S=1.0 (FIG. 9c).

Color Compositing Operations

In practice, the normals derived from a drawing of a teapot 86 create an overly rounded result. Scaling the normals of the body 88 by (0,0.5,0), adding (0,1,0) to the normals of the lid 90, and renormalizing improves the appearance of the teapot as shown in FIGS. 10a–c, which includes the drawing of the teapot (FIG. 10a), overly rounded derived normals (FIG. 10b), and color adjusted normals (FIG. 10c). The use of conventional compositing tools to perform these manipulations as pixel operations is a legacy of Ken Perlin's Image Synthesizer discussed in K. Perlin, An Image Synthesizer. *Computer Graphics* 19, 3 (July), 287–296 (1985).

Drawn Tone Mattes

The silhouette edges of a curved surface mark the transition between the visible and hidden sides of an object from the vantage point of the camera. Similarly, a drawn tone matte defines a boundary between the lit and unlit sides of a character from the vantage point of a light source. Given a tone matte and the location of its light, a normal at a point along the edge of the tone should be perpendicular to the vector from the point to the light. Approximated normals can be refined near a tone matte edge by projecting them onto the plane perpendicular to the light vector and renormalizing.

Sparse Interpolation

The success of the present invention demands accurate interpolation of values across a field when only a few are known in sparse locations. Rather than solve the complex problem of interpolating normals as multi-dimensional, unit-length vectors, the $N_x$ and $N_y$ components are interpolated independently, and $N_z$ is recomputed to maintain unit length. As presented above, the normals on the edge of a circle should interpolate linearly in $N_x$ and $N_y$ to create the profile of a hemisphere.

Multi-resolution interpolation as described in Gortler's Lumigraph paper (see Gortler et al. above) is quick, but requires accurate filtering. In the present invention, a simple iterative dampened-spring diffuser is used during the interpolation process. Known pixel values remain fixed, while unknown pixel values are relaxed across the field using mathematically dampening springs between neighboring pixels. For example, given a field of values P to be interpolated, and a velocity field V initialized to zero, each iteration is computed by:

$$V'_{i,j}=d\cdot V_{i,j}+k\cdot(P_{i-1,j}+P_{i+1,j}+P_{i,j-1}+P_{i,j+1}-4\cdot P_{i,j})\ P'_{i,j}=P_{i,j}+V'_{i,j}$$

Optimal values for the dampening and spring constants vary, but d=0.97 and k=0.4375 minimized the time to convergence for the circle example. Iterations are run until the mean-squared velocity per pixel reaches an acceptable error tolerance. This method takes a few minutes per frame for the examples presented, and results in a smooth minimal surface. As this is a form of the diffusion equation, many methods exist to reach the final steady-state image, for example, the methods described in W.H. Press et al., *Numerical Recipes in C: The Art of Scientific Computing, Second Edition*. Cambridge University Press, Cambridge, United Kingdom (1992).

Rendering

Using 2-D positions and approximated normals, most rendering techniques can be adapted to illuminate a drawing. For maximum control, standard 3-D rendering works best. However, for deployment in a 2-D compositing pipeline, it is useful to implement a sub-set of 3-D algorithms as 2-D compositing operations. It is also possible to use non-photorealistic ("NPR") techniques, and, for integration into live action, captured environmental lighting and high dynamic range rendering.

Standard 3-D Rendering

To render using standard 3-D tools, a rectangle is placed in a scene, and the normals used for illumination are overridden with a texture lookup into the normal image. The shader function can alter material properties for different regions by sampling the ink and paint map as an additional texture source.

Light Source Compositing Operation

To render with a 2-D compositor given a normal image and the location and color of a light source, standard lighting models are written as pixel operators in the compositing software's scripting language. For example, a light vector image to a raster space light source L is formed by creating a four-corner gradient where the corner colors are set to: $(L_x, L_y, L_z)$; $(L_x\text{-width}, L_y, L_z)$; $(L_x, L_y\text{-height}, L_z)$; $(L_x\text{-width}, L_y\text{-height}, L_z)$. Specular and diffuse functions are written independently, but can be combined into more complex procedures. Lighting nodes are applied multiple times and summed for multiple light sources. Additional material parameters such as surface color, specular color, and specular roughness, are stored in look-up tables for use within the lighting functions.

Spheremaps

All the examples presented have been rendered with the fast lighting approximation introduced in the section entitled Region-Based Normals: Blobbing. In other embodiments, rather than light the object itself, a rendered sphere is used as a proxy for the lighting situation. This simplified "distant" lighting model ignores position and is based solely on normal information.

A unit sphere has the special property that any point on the sphere corresponds exactly to its surface normal at that point. Therefore, inspecting a lit sphere at a point shows the proper illumination for the corresponding surface normal. Lighting a point on an arbitrary object with a given normal can be approximated by the illumination of the point on a lit sphere 92 and 94 with the same normal as shown in FIG. 11, which shows spheremap illumination on a drawn teapot 96 and 98 (the rendered spheres (inset) provide illumination for arbitrary objects, e.g., the teapot). The main advantage of this method is speed, since the illumination is independent of the complexity of the lighting on the sphere.

Diffuse and specular spheremaps of a white sphere are prepared using rendering, compositing, or paint tools. When applied to a normal image, these maps produce diffuse and specular lighting images, which are then scaled by base-color and specular-color ink and paint images. Finally, the diffuse and specular components are summed to produce a lit image.

FIGS. 12a–d illustrate the application of illumination to a drawn character. In FIG. 12a, the normal image 100 is diffusely illuminated by five lights via a spheremap. FIG. 12b shows the cat 102 rendered with a standard base-palette. The product 104 of the diffuse illumination and base-palette image is shown in FIG. 12c. Adding specular illumination and further color-styling the elements into the scene results in the image 106 shown in FIG. 12d.

Non-Photorealistic Rendering ("NPR")

Figure 13:
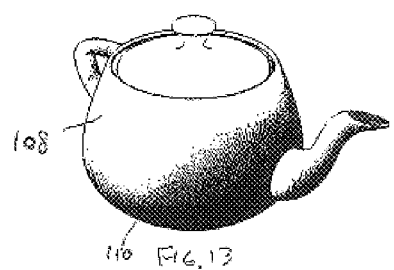
FIG. 13 is a gradient-derived crosshatched perspective drawing of a teapot.

NPR techniques that use normal or gradient information from a surface can be adapted to use approximated normal images. Gradients can be taken from illumination information and used for deriving stroke directions as discussed in P. Haeberli, Paint by numbers: Abstract Image Representations, *Computer Graphics* 24, 4 (Aug.), 207–214 (1990). Three light sources (not shown) contribute to the illustration of the teapot 108 in FIG. 13: one light source provides illumination information, and crosshatch strokes 110 are extracted from the gradients of the remaining two light sources. The method for generating the hatching is an image-based version of the algorithm described in A. A. Apodaca et al. (see previous), where gradient information is taken from illumination data, rather than a parameterized surface, the results slide on objects in motion.

Captured Lighting

Figures 14A, 14B:
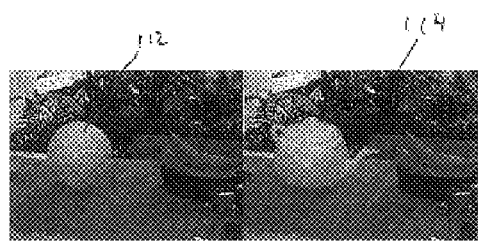
FIGS. 14a–b are photographs of a balloon and the ballon transformed into a teapot by spheremapping.

Spheremapped normals can sample an environment directly. The balloon 112 in the photograph of FIG. 14a is transformed into the teapot 114 in FIG. 14b by using the balloon image as a spheremap. The natural light captured on the balloon transfers the material characteristics to the teapot. Advanced rendering techniques with light probes and irradiance maps can also be applied to the teapot.

Results

The previously discussed still artwork and animated examples demonstrate how the weighted blending of normal approximations drives the illumination of drawn artwork as 3-D curved surfaces. The resulting lighting transforms flat regions of paint into nuanced areas of color much more subtly than traditional tone mattes. The shading achieved with the present invention effectively integrates animated characters and effects elements into live-action scenes. The resulting characters appear to move within the live-action environment more convincingly than earlier efforts.

The technique may also be used within traditional animation to augment 2-D methods for placing characters in painted or rendered environments. Recently, the backgrounds and effects elements have visually outpaced the character treatment. The present invention can help bridge this gap to unify the art direction across all elements.

Animated television programs and commercials can be given a fuller look with only a minimal increase in cost by using the present invention. For projects that demand the subtle performance of hand-drawn animation, the present invention can be used to make 2-D look more like CG images.

Adapting 3-D rendering techniques into compositing operations allows the lighting of objects to be performed in a 2-D pipeline, in concert with other color design work. Outside of animation, this allows the present invention to be used by graphic designers and illustrators to create illuminated artwork without resorting to 3-D tools to build and light geometric models.

The present invention is both useful and cost-effective. There is an incremental cost associated with the use of ink and paint capabilities, and illuminating while compositing requires more time than color-styling with multiple palettes. However, these additional costs are offset by the savings accrued by eliminating the need to draw tone mattes.

In additional embodiments, geometry with more accurate depth information than the balloon inflation method can be achieved by integrating the approximated normals and applying the result to both illumination and shadows. Also, methods for assigning textures to implicit and subdivision surfaces can be adapted to work on drawn objects. Sparse interpolation can derive pseudo-parametric coordinates across an object where "control points" have been drawn as part of the imagery and tagged in ink and paint. Reparameterizing the texture space based on the implied curvature of the normal approximation can reasonably stretch and compress a texture on the object. A broad spectrum of rendering techniques exist for the application of distant illumination through acquired imagery, for example Ramamoorthi and Hanrahan's work (see R. Ramamoorthi et al., An Efficient Representation For Irradiance Environment Maps, *Proceedings of SIGGRAPH* 2001, ACM Press/ACM SIGGRAPH, Computer Graphics Proceedings, Annual Conference Series, ACM, 497–500 (2001). Also, current generation video graphics hardware can be employed to accelerate the lighting process.

The foregoing detailed description of the present invention is provided for purposes of illustration, and it is not intended to be exhaustive or to limit the invention to the particular embodiments disclosed. The embodiments may provide different capabilities and benefits, depending on the configuration used to implement the key features of the invention. Accordingly, the scope of the invention is defined only by the following claims.

What is claimed is:

1. A method for approximating the lighting of a 2-dimensional image, the 2-dimensional image having an interior defined by an edge, wherein the image is lit by a light source having a light vector resulting in the image having a lit portion, an unlit portion, and a boundary between the lit portion and the unlit portion, the method comprising:

approximating a plurality of edge normal vectors along the edge of the image:

approximating a plurality of interior normal vectors across the interior of the image:

providing a tone matte having an edge that defines the boundary between the lit portion and the unlit portion of the image;

adjusting the plurality of edge normal vectors and the plurality of interior normal vectors near the edge of the tone matte by projecting the plurality of edge normal vectors and the plurality of interior normal vectors onto a plane perpendicular to the light vector, renormalizing the plurality of edge normal vectors and the plurality of interior normal vectors; and rendering the image based on the plurality of edge normal vectors and the plurality of interior normal vectors to prepare a rendered image fixed in a tangible medium.

2. A method for approximating the lighting of a 2-dimensional image, the 2-dimensional image having an interior defined by an edge, and the interior of the image including a line having opposed edges, the method comprising:

approximating a plurality of edge normal vectors along the edge of the image;

approximating a plurality of interior normal vectors across the interior of the image;

generating opposed normal vectors on each of the opposed edges of the line by calculating a gradient across the line;

adding a light color along one of the opposed edges of the line and adding a dark color along the other of the opposed edges of the line;

forming a grayscale matte of the image by interpolating the image after the addition of the light color and the dark color to the image; and rendering the image based on the plurality of edge normal vectors and a combination of the opposing normals and the plurality of interior normal vectors using the gray matte as a key to prepare a rendered image fixed in a tangible medium.

3. The method according to claim 2, wherein the step of rendering the image is performed using a technique selected from the group consisting of a 3-dimensional rendering technique and a compositing operation technique.

4. The method according to claim 2, wherein the step of rendering the image is performed using a technique selected from the group consisting of a photorealistic rendering technique and a non-photorealistic rendering technique.

5. The method according to claim 2, wherein the step of approximating the plurality of edge normal vectors includes calculating a gradient across the image and normalizing the gradient.

6. The method according to claim 2, wherein the step of approximating the plurality of interior normal vectors comprises interpolating the plurality of edge normal vectors across the image.

7. A method for approximating the lighting of a 2-dimensional image, the method comprising:

calculating a first approximation of a plurality of normal vectors for the image;

preparing a first confidence matte for the first approximation; preparing a first weighted approximation by weighting the first approximation by the first confidence matte;

calculating a second approximation of a plurality of normal vectors for the image;

preparing a second confidence matte for the second approximation; preparing a second weighted approximation by weighting the second approximation by the second confidence matte;

combining the first weighted approximation and the second weighted approximation; and rendering the image based on the first and second weighted approximations to prepare a rendered image fixed in a tangible medium.

8. The metond according to claim 6, wherein:

each of the plurality of edge normal vectors and each of the plurality of interior normal vectors have directional components including an x-component and a y-component within the plane of the image, and a z-component perpendicular to the plane of the image;

the x-component and the y-components of the plurality of edge normal vectors and the plurality of interior normal vectors are interpolated across the image; and the z-component of each of the plurality of interior normal vectors is recomputed to maintain the unit lenght of the interior normal vector.

9. The method according to claim 2, wherein each of the plurality of edge normal vectors and each of the plurality of interior normal vectors include directional components, wherein one or more of the directional components is scaled to adust the rendered image.

* * * * *